[redacted] T 5186T

[11] 3,581,208

[72] Inventors William Bu
333 Maple
N.Y. 11746;
Gerald F. Woodard, 8 Lakeside Drive,
Centerport, both of, N.Y. 11721

[21] Appl. No. 784,034
[22] Filed Dec. 16, 1968
[45] Patented May 25, 1971

[54] EMERGENCY WARNING AND IDENTIFICATION APPARATUS FOR TWO-WAY RADIO COMMUNICATION SYSTEM
5 Claims, 4 Drawing Figs.

[52] U.S. Cl. .......... 325/64, 325/55, 340/171, 340/224
[51] Int. Cl. .......... H04b 7/00
[50] Field of Search .......... 325/64, 55; 340/224, 171, 171, PPF. 167, 293, 294, 167 A,B, 206

[56] References Cited
UNITED STATES PATENTS
2,987,712 6/1961 Polyzou .......... 340/409
et al. .......... 325/64

*Primary Examiner*—Robert L. Richardson
*Assistant Examiner*—Donald E. Stout
*Attorney*—Kenneth P. Robinson

ABSTRACT: Apparatus for audio communications and other such systems are disclosed in which a plurality of portable transceivers each generate a signal having audio components and a unique combination of continuous wave frequency components, for transmission to a remote station. Manual operation of a multiposition switch in each transceiver permits indicating the existence of an emergency or nonemergency transmit condition by controlling the duration of one of the continuous wave frequency components. The transmitted signal is received at the remote station where circuitry filters and detects the unique combination of continuous wave frequency components to identify the transceiver and also determines the duration of the controllable duration component to indicate the particular transceiver's condition. Other embodiments are also covered.

EMERGENCY WARNING AND IDENTIFICATION APPARATUS FOR TWO-WAY RADIO COMMUNICATION SYSTEM

SUMMARY OF THE INVENTION

This invention relates to audio communication systems and more particularly to such systems having signal generators at various locations which generate signals for transmission to a remote station where the signals are received and processed.

Signal generating apparatus utilized in transceivers and transmitting units of present audio communication systems generate signals for transmission to a remote station. These generated signals have audio components responsive to verbal utterances of the operator. However, it is desirable, for example when the operator is unable to speak, to provide signals which additionally permit identification at a remote station of the originating or transmitting unit as well as the existence of an emergency or other predetermined condition at that unit without the need for any such verbal utterances.

Objects of this invention are, therefore, to provide new and improved signal generators and signal processors usable in an audio communication system; to provide such generators which generate signals having both audio and information components for transmission to a remote station; and to provide such processors for use at the remote station for processing received signals to indicate the originator of each signal and various predetermined conditions existing at that originator.

In accordance with the present invention, there is provided signal generating and processing apparatus usable in an audio communication system in which a plurality of signal generators each generate a signal having at least identifying and predetermined condition indicating components for transmission to a remote station where the received signal is processed to identify the originator of the signal and the respective condition of each originator, comprising: signal generating apparatus associated with each originator comprising: (a) signal generating means for generating a unique combination of continuous wave frequency signals, at least one of which is of controllable duration, including means for generating a first continuous wave frequency signal and means for generating a second continuous wave frequency signal, the (c) combination permitting identification at a remote station of the signal generating apparatus; (b) manually activatable control means coupled to the signal generating means for controlling the duration of the controllable duration signals, different durations of the continuous wave frequency signals corresponding to different predetermined conditions, and cmeans responsive to the first and second frequency signals and a supplied third signal capable of having audio components, for mixing the three signals for generating an output signal for transmission to a remote station. The apparatus further includes signal processing apparatus associated with a remote station, comprising: (a) frequency separating means responsive to a unique combination of continuous wave frequency components in the signal received from an originator for generating a first signal for identifying the originator, the first signal additionally being representative of the duration of the continuous wave frequency components; and (b) means responsive to the first signal for generating a second signal for indicating the condition of the originator, different durations of the continuous wave frequency components corresponding to different predetermined conditions.

BRIEF DESCRIPTION OF THE DRAWINGS

Referring to the drawings.

DESCRIPTION OF FIGS. 1, 2 AND 3

Figure 1:
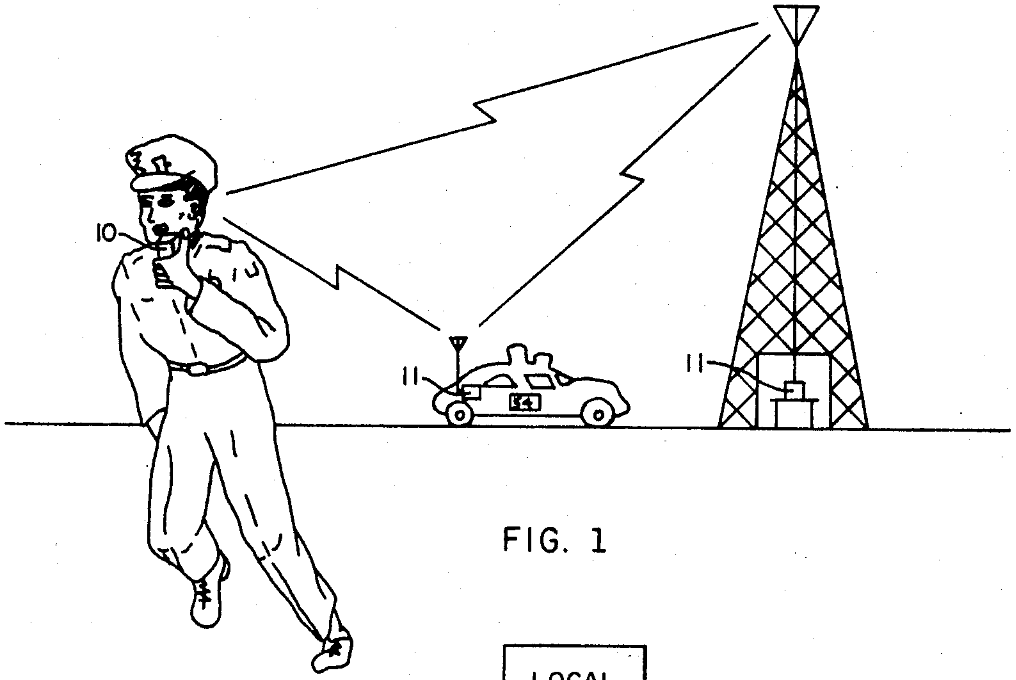
FIG. 1 is an overall perspective view of one form of audio communication system, in accordance with the invention, in which signals generated by signal generating apparatus in a portable transceiver are transmitted to a remote station, such as a motor vehicle or a central headquarters, or both, where the received signals are processed.

There is shown in FIG. 1 a perspective view of one form of audio communication system having a signal generating apparatus 10 located, for convenience, in a hand held portable transceiver. Also shown is signal processing apparatus 11, which is located both in a motor vehicle and at a central station. While the system of FIG. 1 only shows a single apparatus 10 and two processing apparatus 11, it will be recognized that any number of such apparatus 10 or 11 may be included in a system, and that they may be either mobile or stationary. In one such system arrangement, system processing apparatus 11 could operate in base stations, each located in a different area, and process signals received from one or more signal generating apparatus 10 located within their respective areas. In another arrangement, the transmitted signals could be received and retransmitted by more powerful transmitting circuitry in vehicles located within the area to a central station for processing by processing apparatus 11 at the central station. Also, various selected portions of apparatus 10 or 11 could be at each location.

Figure 2:
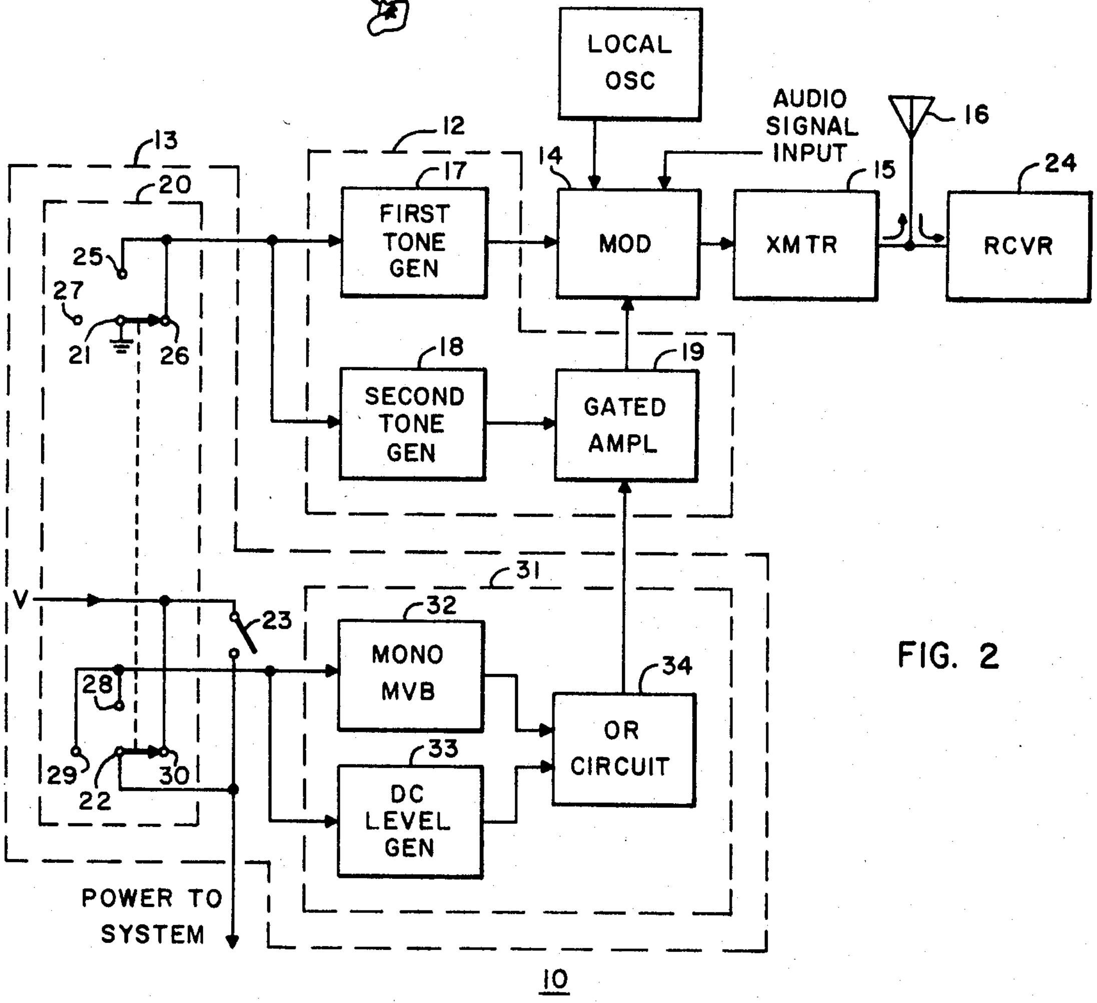
FIG. 2 is a block diagram of one form of signal generating apparatus constructed in accordance with the invention.

Referring to FIG. 2 there is shown a block diagram of one form of signal generating apparatus 10 suitable for use in the hand held transceiver of the FIG. 1 system. Signal generating apparatus 10 includes a signal generating means 12 for generating a unique combination of continuous wave frequency signals, at least one of which is of controllable duration. A manually activatable control means 13 is connected to the signal generating means 12 for controlling the duration of the controllable duration signals, different durations of the continuous wave frequency signals corresponding to different predetermined conditions. Signal generating apparatus 10 further includes a mixing means, shown for convenience as a modulator 14, responsive to the first and second continuous wave frequency signals and to a supplied third signal having audio components, for mixing the three signals for generating an output signal for transmission, via transmitter 15 and antenna 16, to a remote station.

Signal generating means 12 includes means, shown as first tone generator 17 whose output is connected to an input of modulator 14, for generating a first continuous wave frequency signal whose duration is substantially coextensive with the duration of the output signal developed by modulator 14.

Signal generating means 12 further includes means, shown as a second tone generator 18 and a gated amplifier 19 whose output is connected to another input of modulator 14, for generating a controllable duration second continuous wave frequency signal. The first and second continuous wave frequencies comprise a unique frequency combination for permitting identification of generating apparatus 10 at a remote station.

Control means 13 is shown to include a manually adjustable multiposition switch 20 having a first pole 21 connected to a reference potential shown as ground, a second pole 22 connected to one terminal of an on-off switch 23 whose other terminal is connected to a reference potential shown as voltage V which is used in supplying system power, and a third pole (not shown) for appropriately connecting antenna 16 to either transmitter 15 or a receiver 24, depending on the particular positions of the switch 20. The switch 20 additionally includes, relative to first pole 21, a first position contact 25 and a second position contact 26 both connected to the inputs of first and second tone generators 17 and 18; and a floating third position contact 27, also relative to first pole 21. The switch 20 is further shown to include, relative to the second pole 22, a first position contact 28 connected to a third position contact 29, and a second position contact 30 connected to voltage V. Each position of switch 20 corresponds to a different state of control means 13.

Control means 13 further includes gating circuitry means, unit 31, responsive to the position of switch 20 for causing the signal generating means 12 to generate continuous wave frequency signals of different duration. In particular, the switch 20 has a first position, in which the first and second poles 21 and 22 are connected to their respective first position contacts 25 and 28, for indicating a nonemergency transmit condition; and a second position, in which the first and second poles 21 and 22 are connected to their respective second position contacts 26 and 30, for indicating an emergency condition. Analogously, the third position of switch 20 corresponds to a receive mode. In the first and second positions of switch 20 the third pole thus connects the output of transmitter 15 to antenna 16, and in the third position connects antenna 16 instead to receiver 24.

Unit 31 is responsive to the positions of switch 20 for causing the second frequency generating means to generate the second continuous wave frequency signal having a greater duration for the second position of switch 20 than for the first position so that the emergency and nonemergency transmit conditions are distinguishable at a remote station. This second continuous wave frequency signal is provided at the output of unit 19.

Unit 31 includes a monostable multivibrator 32 and a DC level generator 33, both of whose inputs are each connected to first and third position contacts 28 and 29. Generator 33 is of the inverting type which generates a predetermined DC output level when no signal is applied to its input and which generates no DC output when a signal is supplied to its input. Also included in unit 31 is OR gate 34 having one input connected to the output of monostable multivibrator 32 and the other input connected to the output of DC level generator 33. The output of OR gate 34, at which is developed a control signal for controlling the duration of the second continuous wave frequency signal, is connected to one input of gated amplifier 19 whose other input is connected to the output of second tone generator 18. The enabling of both inputs to amplifier 19 causes the second continuous wave frequency signal to be developed at the amplifier 19 output.

Figure 3:
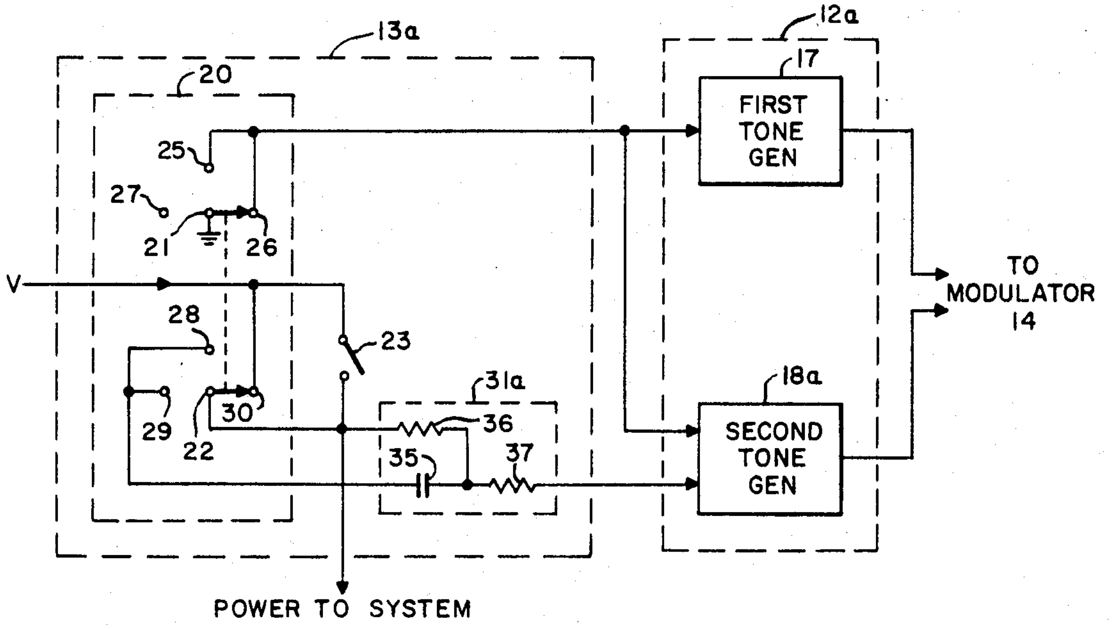
FIG. 3 is a block diagram of a variation in the signal generating apparatus of FIG. 2, constructed in accordance with the invention and whose circuitry may be substituted for corresponding circuitry in the embodiment of FIG. 2.

Referring to FIG. 3 there is shown a circuitry variation which may be substituted for corresponding circuitry in the embodiment of FIG. 2. Gating circuitry means **31*a*, which performs a function analogous to that of unit 31 in FIG. 2, includes a capacitor 35 having one end connected to first and third position contacts 28 and 29 and the other end connected to joined ends of resistances 36 and 37; the other end of resistance 36 being connected to second pole 22 of switch 20 and the other end of resistance 37 being connected to one input of a second tone generator 18*a*. Second tone generator 18*a*, together with first tone generator 17, is included in signal generating means 12*a* whose function is analogous to that of means 12 of FIG. 2. First tone generator 17 is depicted to be the same in both embodiments. However, second tone generator 18*a* of the FIG. 3 embodiment has two inputs rather than only one as shown for unit 18 of FIG. 2. One of the two inputs is connected to resistance 37 and the other is connected to contacts 25 and 26 of switch 20 as is the single input of unit 18 in FIG. 2. Gating is thereby accomplished at the input to second tone generator 18*a*, permitting elimination of FIG. 2 gated amplifier 19, so that the second controllable duration continuous wave frequency signal is provided at the output of second tone generator 18*a***.

DESCRIPTION OF FIG. 4

Figure 4:
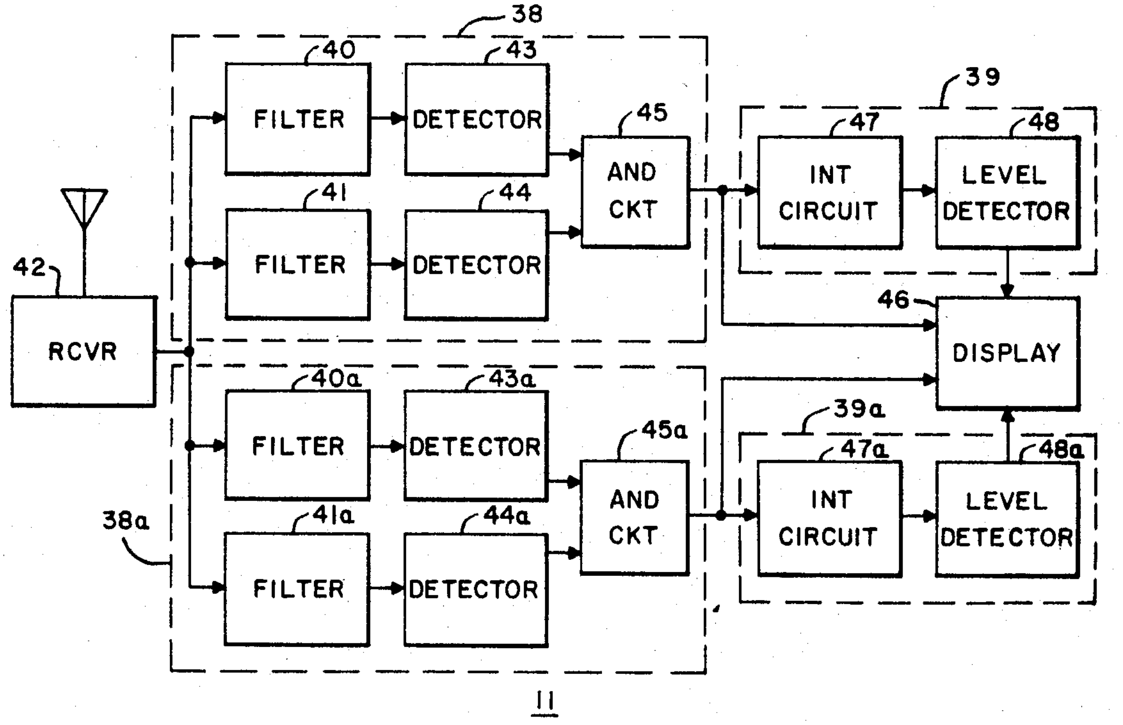
FIG. 4 is a block diagram of one form of signal processing apparatus, also in accordance with the invention.

FIG. 4 is a block diagram of one form of signal processing apparatus 11 constructed in accordance with the invention and suitable for use in a FIG. 1 system for processing received signals having unique combinations of controllable duration continuous wave frequency components. Signal processing apparatus 11 includes frequency separating means 38 responsive to a unique combination of continuous wave frequency components in the signal received from an originator such as a transceiver having signal processing apparatus 10 of FIG. 2 for generating a first signal for identifying the originator of the received signal; the first signal additionally being representative of the duration of the continuous wave frequency components. Processing apparatus 11 further includes means 39 responsive to the first signal for generating a second signal for indicating the condition of the originator of the received signal, different durations of the continuous wave frequency component corresponding to different predetermined conditions.

In the embodiment shown, since the received signals will have a first continuous wave frequency component whose duration is substantially coextensive with the duration of the received signal and a second continuous wave frequency signal of controllable duration, frequency separating means 38 includes first and second filtering circuits 40 and 41 which are both supplied the demodulated received signal by a receiver 42, and first and second detecting circuits 43 and 44 whose respective inputs are connected to the outputs of corresponding filtering circuits 40 and 41. Circuit pairs 40—43 and 41—44 respectively separate the first and second continuous wave frequency components and supply these components to the inputs of a coincidence circuit, AND gate 45, at whose output is provided the aforementioned first signal upon coincidence of the first and second continuous wave frequencies. The first signal whose generation thus corresponds to the reception of a signal from a particular transceiver, may be stored or displayed, as desired, and is shown supplied to a display 46 for enabling an appropriate indicating device.

An analogous first signal will be developed by unit **38*a* due to circuit pairs 40*a*—43*a* and 41*a*—44*a* activating AND gate 45*a* and likewise will be supplied to display 46 to denote reception of a signal from a different transceiver. Similar units 38*b*, 38*c* and the like (not shown) each will develop corresponding signals to be supplied to display 46** for identifying signals received from one of the other originating transceivers. It will be recognized that the particular number of frequencies required to provide a sufficient number of unique frequency combinations depends upon the number of originating transceiver units in a system and appropriate corresponding arrangements of filtering and detecting circuits may be required for different systems.

Second signal generating means 39 includes an integrator circuit 47 whose input is connected to the output of AND circuit 45 and whose output is connected to the input of a level detector circuit 48. The output of level detector circuit 48 provides the aforementioned second signal for indicating the duration of the controllable continuous wave frequency signal component relative to a prescribed duration, the exceeding or the nonexceeding of the prescribed duration corresponding to the existence of an emergency or a nonemergency transmit condition, respectively, at the originator. In like manner, the input of an integrator circuit **47*a* is connected to the output of AND circuit 45*a*, so that integrator circuit 47*a* and a level detector circuit 48*a* are serially connected to develop an analogous second signal at the output of level detector circuit 48*a*. This second signal is provided for indicating the duration of the controllable continuous wave frequency signal component in a second originator unit and is similarly supplied to display 43. Units 47*a* and 48*a* thus comprise signal generating means 39*a* for generating another second signal. As discussed with reference to unit 38, similar units 39*b*, 39*c*** and the like (not shown) each develop a respective second signal corresponding to a different prescribed originator.

SYSTEM OPERATION

General

The embodiment of signal generating apparatus 10 shown in FIG. 1 is mounted within a portable transceiver. An output signal having audio components and two unique continuous wave frequency components is generated by apparatus 10 for transmission to a remote station. A different unique pair of continuous wave frequencies is developed by each signal generating apparatus 10, thereby permitting signal processing apparatus 11 located at the remote station to identify the originator of the signal. Manual selection of a particular position of multiposition switch 20 by the transceiver operator controls the duration of one of the continuous wave frequency components causing signal processing apparatus 11 to generate a signal for indicating the existence of various predetermined conditions at that particular transceiver. In particular, selection of a second switch position by the operator is used for causing the controllable continuous wave frequency signal to exceed a prescribed duration for indicating the existence of an emergency condition at the transceiver. Thus, even if the operator of the transceiver is unable to speak, the originating transceiver is identified by the signal generated by its signal generating apparatus 10 and the existence of a predetermined condition can be indicated and displayed at the remote station. If desired, motor vehicles having signal processing apparatus 11 may be utilized as remote stations. One or more vehicles can have a complete processing apparatus 11 for identifying all the system transceivers and indicating a predetermined condition associated with them or, alternatively, each vehicle can have only one set of filtering and detecting circuits 37, 38, 40, and 41, and thus be responsive to signals received from only one transceiver. In either instance, the signal received from each transceiver can be retransmitted by circuitry in the vehicle to a central or base station also having signal processing apparatus 11. If desired, an emergency or predetermined condition indicating signal can also be used for activating a horn or siren or other such device in the vehicles.

OPERATION OF SIGNAL GENERATING APPARATUS 10

Manually selectable multiposition switch 20 is shown as having a first position for indicating a nonemergency transmit condition, a second position for indicating the existence of an emergency condition, and an optional third or receive position. Multiposition switch 20 is depicted as a two pole switch but, if the third or receive position is included, it may additionally have a third pole (not shown) for switching antenna 16 between transmit modes (first and second positions of switch 20) and the receive mode (third position of switch 20).

Although not necessary for the operation of said signal processing apparatus 10, a convenient on-off switch 23 is shown in which, when in the ON position, provides system power for the first and third positions of multiposition switch 20. However, on-off switch 23 is bypassed in the third or emergency condition position of switch 20 thereby providing power to the system regardless of the position of on-off switch 23. To facilitate the subsequent discussion, it will be assumed that on-off switch 23 will be in the ON position.

Both the first and second positions of multiposition switch 20 cause the activation of first tone generator 17. A first continuous wave frequency signal, provided at the output of first tone generator 17 is supplied directly to the modulator 14 so that in both positions of switch 20 the first continuous wave frequency signal has a duration substantially coextensive with the duration of the output signal developed by the modulator 14. As is shown in FIG. 3, the same result occurs in the embodiment as well. It will be recognized that selection of particular continuous wave frequencies for use in any system is usually not critical and is based upon various known system parameters as well as convenience and availability.

Referring to FIG. 2, the second continuous wave frequency signal is supplied to gated amplifier 19 whose output provides the second continuous wave frequency signal of controllable duration which is then supplied to modulator 14. Because of the inverting nature of level generator 33, the second position of switch 20 removes the applied signal from the input of the level generator 33 which causes the activation of level generator 33 so that a relatively constant DC signal is provided for activating gated amplifier 19 for as long as the switch 20 is in the second position thereby causing the second continuous wave frequency signal to also have a duration substantially coextensive with that of the output signal. As previously stated, the relatively long duration of the second continuous wave frequency signal is used to denote the existence of an emergency condition. Alternatively, the first position of switch 20 causes the deactivation of level generator 33 and the activation of monostable multivibrator 32 which couples a single pulse through OR circuit 34 to gated amplifier 19, thereby supplying a second continuous wave frequency signal of relatively short duration to the modulator 14. As shown, modulator 14 also receives an input signal from a local oscillator. The continuous wave frequency signals are mixed in modulator 14 with the supplied third signal having audio components and a modulated combined output signal supplied to transmitter 15 for transmission to the remote station via antenna 16. It will be recognized that when the third signal is of zero amplitude such as, for example, when the operator is unable to speak so that no audio components will be generated, a combined output signal without audio components will be generated and transmitted to the remote station. In an alternative arrangement shown in FIG. 3, second tone generator **18*a* has two inputs, one of which is connected to the output of gating circuitry 31*a*, permitting the output of second tone generator 18*a* to be coupled directly to the modulator 14. Providing a result analogous to that of the embodiment of FIG. 2, gating circuitry 31*a* generates either a pulse-type signal or a substantially DC level signal for causing second tone generator 18*a* to respectively generate either a second continuous wave frequency signal of relatively short duration when switch 20 is in the first position, or a longer second continuous wave frequency signal whose duration is substantially coextensive with the duration of the output signal when switch 20** is in the second position. It should be noted that other different distinguishable durations may also be provided to indicate various predetermined conditions.

OPERATION OF SIGNAL PROCESSING APPARATUS 11

With reference to signal processing apparatus 11, a signal such as the one transmitted by the transceiver of FIG. 1 containing signal generating apparatus 10, is received at receiver 42, as shown in FIG. 3. First filter-detector pair 40—43 and second filter-detector pair 41—44, of frequency separating means 38, are together responsive to and separate one unique pair of continuous wave frequency components in the signal received from the transceiver. A first signal is thereby developed at the output of AND circuit 45 upon coincidence of this frequency pair. Since only one such unique combination exists in any one received signal, development of this particular first signal thus identifies the particular transceiver that originated the signal received at receiver 42. Portions of the two continuous wave frequency components in a received signal are coincident and AND circuit 45 develops the first signal upon existence of coincidence. In the particular system described, the first continuous wave frequency component has a duration substantially coextensive with that of the received signal while the second continuous wave frequency component is of controllable duration so that the first signal is developed for a time substantially equal to the duration of the second frequency component.

Second signal generating means 39 is responsive to the duration of the first signal, and thus the duration of the second continuous wave frequency component, and develops a second signal at the output of level detector circuit 48 to indicate the existence of various predetermined conditions at the transceiver. In the embodiment shown, a relatively short duration second continuous wave frequency component indicates the existence of a nonemergency transmit condition at the transmitting transceiver. A component of relatively long duration, which, for convenience, is of a duration substantially equal to that of the first continuous wave frequency component, designates the existence of an emergency condition. The length of these short and long durations are relative to the previously described predetermined duration which corresponds to a particular level of level detector 48.

Included in second signal generating means 39 is integrating circuit 44 which performs an approximate integration of the first signal to develop an integrated signal, the amplitude of the integrated signal being proportional to the duration of the second continuous wave frequency component. Level detector circuit 48, responsive to the output of integrator circuit 44, generates the second or predetermined condition indicating signal when the developed integrated signal exceeds the predetermined amplitude or level, thus distinguishing the nonemergency transmit condition from an emergency condition. This second signal is supplied to display 46 where, in conjunction with the corresponding first signal, it provides a visual indication of the transceiver condition. Similar visual indications for all the transceivers are provided by the generation of corresponding first and second signals for each transceiver.

While there have been described what is at present considered to be the preferred embodiments of the invention, it will be obvious to those skilled in the art that various changes and modifications may be made therein, without departing from the invention, and it is, therefore, aimed in the appended claims, to cover all such changes and modifications as fall within the true spirit and scope of the invention.

What is claimed is:

1. Signal generating and processing apparatus usable in an audio communication system in which a plurality of signal generators each generate a signal having at least identifying and predetermined condition indicating components for transmission to a remote station signal and a second continuous wave frequency component of controllable duration, the received signal is processed to identify the originator of the signal and the respective condition of each originator, comprising:

signal generating apparatus associated with each originator, comprising:

a. a manually adjustable switch having a first position for indicating a nonemergency transmit condition and a second position for indicating an emergency condition;

b. means responsive to the positions of said switch for generating a first continuous wave frequency signal whose duration is substantially coextensive with the duration of a developed output signal;

c. means responsive to the positions of said switch and to a developed gating signal for generating a second continuous wave frequency signal of controllable duration, said first and said second continuous wave frequencies comprising a unique combination for permitting identification of said signal generating apparatus at a remote station;

d. gating circuitry means for developing said gating signal responsive to the positions of said switch for causing said second generating means to generate the second continuous wave frequency signal having a greater duration for said second switch position than for said first switch position so that emergency and nonemergency transmit conditions are distinguishable at the remote station, and e. means responsive to said first and second continuous wave frequency signals and a supplied third signal capable of having audio components, for mixing said three signals for generating an output signal for transmission to the remote station; and signal processing apparatus associated with a remote station, comprising:

a. frequency separating means responsive to a unique combination of continuous wave frequency components in the signal received from an originator, including first and second filtering and detecting circuits for respectively separating said first and second continuous wave frequency components, and an AND circuit coupled to the first and second detecting circuits for developing a first signal for identifying said originator, said first signal additionally being representative of the duration of said continuous wave frequency components, and b. means responsive to said first signal for developing a second signal for indicating the duration of said controllable continuous wave frequency signal relative to a prescribed duration, the exceeding or nonexceeding of said prescribed duration corresponding to the existence of an emergency or nonemergency transmit condition, respectively, at the originator.

2. Signal processing apparatus usable in an audio communication system for processing received signals having a first continuous wave frequency component whose duration is substantially coextensive with the duration of said received signal, and a second continuous wave frequency component of controllable duration, for identifying the originator of said received signals and the condition of said originator, comprising:

frequency separating means responsive to a unique combination of continuous wave frequency components in the received signal, including first and second filtering and detecting circuits for respectively separating said first and second continuous wave frequency components, and an AND circuit coupled to the first and second detecting circuits for developing, upon coincidence of the first and second continuous wave frequency components, a first signal for identifying the originator of said received signal;

and means responsive to said first signal for developing a second signal for indicating the duration of said controllable continuous wave frequency signal relative to a prescribed duration, the exceeding or nonexceeding of said prescribed duration corresponding to the existence of an emergency or nonemergency transmit condition, respectively, at the originator.

3. Signal generating apparatus usable in a two-way radio communication system for generating a signal having at least identifying and predetermined condition indicating components for transmission to a remote station, comprising:

continuous wave frequency generating means for generating a unique combination of continuous wave frequency signals, including a first continuous wave frequency generator for generating a first continuous wave frequency signal and a second continuous wave frequency generator for generating a second continuous wave frequency signal of controllable duration, said signals combining to form a unique signal combination permitting identification at the remote station of the signal generating apparatus and the indication of an emergency condition at said station without audio communication from said signal generating apparatus;

a manually adjustable multiposition control switch having a first position for indicating a nonemergency transmit condition and a second position for indicating an emergency condition, for causing said continuous wave frequency generating means to generate first and second continuous wave frequency signals of different duration, different durations of said continuous wave signals corresponding to said different predetermined conditions;

gating circuitry means responsive to said first and second switch positions, for causing said second continuous wave frequency generating means to generate a second continuous wave signal having a greater duration for said second switch position than for said first switch position, so that emergency and nonemergency transmit conditions are thereby distinguishable at the remote station; and a modulator, responsive to said first and second continuous wave frequency signals and a supplied third signal capable of having audio components, for mixing said three signals for generating an output signal for transmission to the remote station.

4. Signal processing apparatus usable in a two-way radio communication system for processing received signals having a unique combination of controllable duration continuous wave frequency components, for identifying the originator of said received signals and the condition of said originator, comprising:

frequency separating means responsive to said unique combination of continuous wave frequency components in the received signal, said signal having a first continuous wave frequency component whose duration is substantially coextensive with the duration of said received signals and a second continuous wave frequency component of controllable duration, for generating a third signal for identifying the originator of said received signal, said first signal additionally being representative of the duration of said continuous wave frequency components, said frequency separating means including first and second filtering and detecting circuits for respectively separating said first and second continuous wave frequency components, and a coincidence circuit coupled to the first and second detecting circuits for developing said first signal upon coincidence of said first and second continuous wave frequency components;

and means responsive to said first signal for generating a second signal for indicating the condition of the originator of said received signal, different durations of said continuous wave frequency components corresponding to different predetermined conditions.

5. Signal processing apparatus usable in a two-way radio communication system for processing received signals having unique combinations of controllable duration continuous wave frequency components, for identifying the originator of the received signal and the condition of said originator, comprising:

frequency separating means responsive to a unique combination of continuous wave frequency components in the received signal, said received signal having a first continuous wave frequency component whose duration is substantially coextensive with the duration of said received signal and a second continuous wave frequncy component of controllable duration, for generating a first signal for identifying the originator of said received signal, said first signal additionally being representative of the duration of said continuous wave frequency component, said frequency separating means including first and second filtering and detecting circuits for respectively separating said first and second continuous wave frequency components, and a coincidence circuit coupled to the first and second detecting circuits for developing said first signal upon coincidence of said first and second continuous wave frequency components;

and means responsive to said first signal for developing a second signal for indicating the duration of said controllable continuous wave frequency component relative to a prescribed duration, the exceeding or nonexceeding of said prescribed duration corresponding to the existence of an emergency or nonemergency transmit condition, respectively, at the originator.

UNITED STATES PATENT OFFICE

CERTIFICATE OF CORRECTION

Patent No. 3,581,208 Dated May 25, 1971

Inventor(s) William E. Buehrle, Jr., et al.

It is certified that error appears in the above-identified patent and that said Letters Patent are hereby corrected as shown below:

On the cover sheet insert -- [73] Assignee Hazeltine Corporation --.

Signed and sealed this 30th day of November 1971.

(SEAL)
Attest:

EDWARD M.FLETCHER,JR.
Attesting Officer

ROBERT GOTTSCHALK
Acting Commissioner of Patents